United States Patent [19]
Sprick

[11] Patent Number: 5,884,554
[45] Date of Patent: Mar. 23, 1999

[54] BARBECUE

[76] Inventor: Hermann-Josef Sprick, Dwerberge 3, Vinnen, Germany, D-49774

[21] Appl. No.: 945,835

[22] PCT Filed: May 3, 1996

[86] PCT No.: PCT/DE96/00784

§ 371 Date: Nov. 5, 1997

§ 102(e) Date: Nov. 5, 1997

[87] PCT Pub. No.: WO96/34549

PCT Pub. Date: Nov. 7, 1996

[30] Foreign Application Priority Data

May 6, 1995 [DE] Germany .......................... 19516715.5
Mar. 4, 1996 [DE] Germany .......................... 19608175.0

[51] Int. Cl.⁶ .............................. A47J 37/00; A47J 37/04
[52] U.S. Cl. ................................. 99/340; 99/397; 99/449; 99/450; 99/427; 126/25 R; 126/25 A; 126/9 R
[58] Field of Search ............................ 99/339, 340, 390, 99/391–393, 394–398, 426, 427, 443 C, 443 R, 448, 449, 450; 126/25 R, 25 A, 9 R, 9 B, 25 AA, 41 R

[56] References Cited

U.S. PATENT DOCUMENTS

| | | | |
|---|---|---|---|
| 261,870 | 8/1882 | Perkins ................................... | 99/397 X |
| 2,573,988 | 11/1951 | Saltzberg .............................. | 99/339 X |
| 2,576,028 | 11/1951 | Mitchell ................................... | 99/397 |
| 3,335,712 | 8/1967 | Marasco ................................ | 99/391 X |
| 3,559,565 | 2/1971 | Getz . | |
| 3,922,961 | 12/1975 | Case ......................................... | 99/427 |
| 4,421,016 | 12/1983 | Sich ......................................... | 99/427 |
| 4,442,763 | 4/1984 | Beller ..................................... | 99/449 X |
| 4,470,343 | 9/1984 | Didier .................................... | 99/448 X |
| 4,541,406 | 9/1985 | DeSambiagio .......................... | 126/9 R |
| 4,562,771 | 1/1986 | Williams ................................... | 99/397 |
| 4,744,292 | 5/1988 | Nagata .................................. | 99/391 X |
| 4,944,282 | 7/1990 | Aguiar et al. ......................... | 126/25 R |

FOREIGN PATENT DOCUMENTS

| | | |
|---|---|---|
| 1 454 157 | 8/1969 | Germany . |
| 1454157 | 8/1969 | Germany . |
| 73 13 205 | 4/1973 | Germany . |
| 24 21 428 | 5/1974 | Germany . |
| 7418511.8 | 5/1974 | Germany . |
| 2425860 | 12/1975 | Germany . |
| 75 36 710.1 | 4/1976 | Germany . |
| 7536710 | 4/1976 | Germany . |

*Primary Examiner*—Timothy F. Simone
*Attorney, Agent, or Firm*—Merchant, Gould, Smith Edell, Welter & Schmidt

[57] ABSTRACT

The invention relates to a barbecue with a flat barbecue food carrier swiveling by means of a motor and a lifting and/or lowering device for changing the spacing of the barbecue food carrier from a heating device at least while turning the barbecue food carrier, with a combined turning as well as lifting device consisting of a lifting arm and swivel arms swiveling by means of a drive being provided, which are connected with the barbecue food carrier, the fulcrums of the swivel and lifting arms being spaced from each other in favor of a swiveling and rotary movement of the barbecue food carrier with simultaneous movement of the lifting and swivel arms, the lifting and swivel arms being provided with guide elements engaged with each other for at least part of the path of motion of the lifting and swivel arms in foavour of the force guidance of the swivel arm.

8 Claims, 4 Drawing Sheets

BARBECUE

BACKGROUND OF THE INVENTION

The invention relates to a barbecue.

In the case of the known barbecues which, for instance, are heated with charcoal, the barbecue food such as sausages, pork chops and the like is turned manually on the cooking grill in order to achieve uniform cooking of the barbecue food. Particularly when too much barbecue food is on the cooking grill, this can be extremely time-consuming and, moreover, it is annoying for the person attending the barbecue to be subjected to the clouds of smoke produced.

It is also well-known that, in order to achieve uniform turning of the barbecue food, a spit is used which can be turned automatically. Such a spit should, for instance, be used for large roasts and the like, but not for small sausages and, especially, not flat barbecue food such as pork chops and the like. This barbecue food requires a flat barbecue food carrier to permit cooking of a large number of smaller barbecue food items simultaneously, or for flat barbecue food such as steaks and the like, and appliances permitting flat barbecue food carriers to be designed suitable for turning, on the one hand, and to remove the barbecue food carrier while turning from the heating device so as to prevent the cooking grill from butting in front of the heating device upon turning of the large area cooking grill, on the other, already form part of the state of the art. After completion of turning the barbecue food carrier is again brought near the heating device in order to achieve a, preferably, full utilization of the heat onto the barbecue food.

A corresponding barbecue is known, for instance, from the generic DE-OS 1 454 157 as well as from DE-GM 75 36 710.

The disadvantage of the barbecue known from DE-OS 1 454 157 lies in the fact that the device for turning and lifting or lowering, respectively, has been designed at great expense, thus making it cost-intensive in manufacture on the one hand, and liable to breakdowns, on the other.

SUMMARY OF THE INVENTION

It is the object of the invention to carry on the development of a generic barbecue so that both the lifting and the rotary movements of a flat cooking grill are performed with a device which can be manufactured at a favorable price and which, moreover, is durable.

In accordance with the the present invention a barbecue is proposed in which a linkage is provided for the lifting and rotary movements of the flat cooking grill, which linkage is substantially composed of a motorized, swiveling lifting arm and swivel arm, with the lifting arm being guided, and of devices for achieving guidance of the swivel arm at the moving lifting arm for at least part of the working range. On the one hand, the use of the lever-type swivel arm and the lever-type lifting arm makes it possible to have the drive designed to a common lifting and rotary movement of the barbecue food carrier, simply and at favorable cost, while the forced guidance of the lifting and swivel arm, which takes place at least temporarily, allows each turn of the barbecue food carrier through 180° to take place, thereby preventing the barbecue food carrier from turning back again to that side which already had been facing the heating device prior to commencement of the turn.

Preferred embodiments of the invention are explained in the sub-claims.

BRIEF DESCRIPTION OF THE DRAWINGS

One embodiment of the invention is illustrated below in the drawings in which.

DETAILED DESCRIPTION

Figure 1:
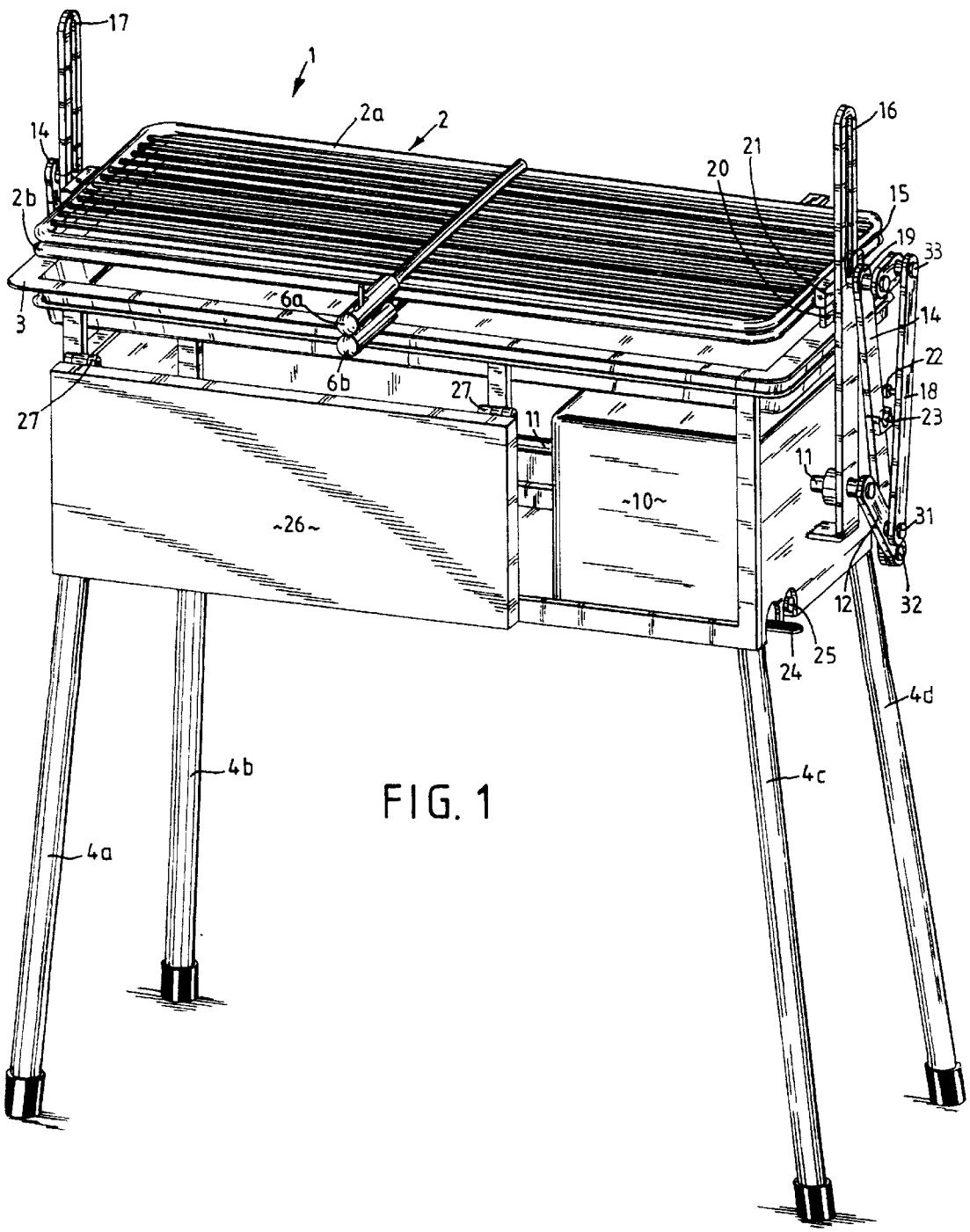
FIG. 1 is a diagrammatic representation of a barbecue.

Referring to FIG. 1, a barbecue 1 is illustrated which is substantially composed of a barbecue food carrier 2 which, in this embodiment, is designed as a cooking grill, a bowl 3 for the barbecue charcoal, charcoal briquettes or the like, as well as legs 4a through 4d. The bowl 3 can be easily removed from the barbecue and cleaned.

Figure 2:
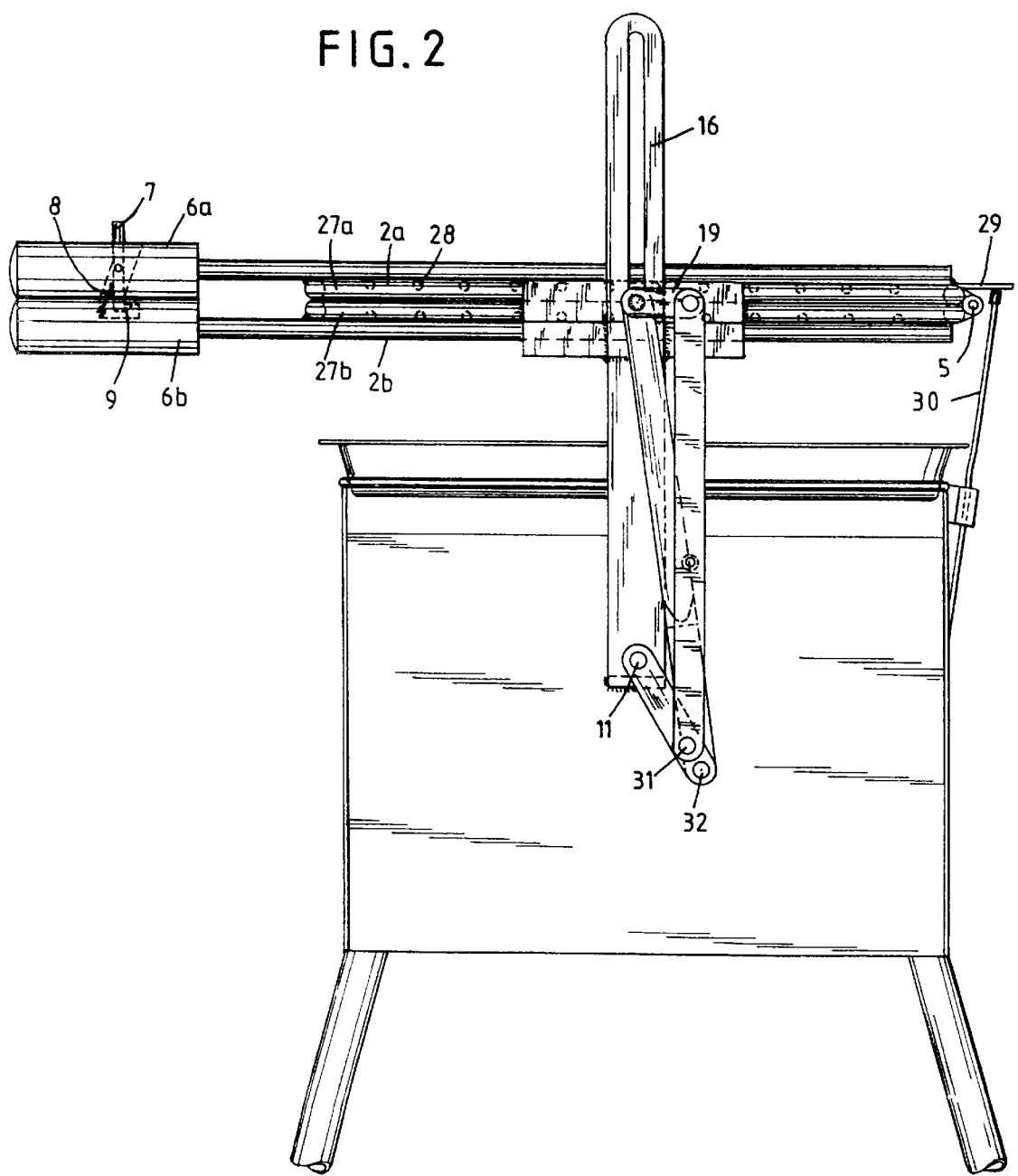
FIG. 2 shows the front face of the barbecue illustrated in FIG. 1.

The cooking grill 2 consists of an upper cooking grill 2a and a lower cooking grill 2b which are both joined together by means of a linkage 5, as shown in FIG. 2. On the upper and lower cooking grills 2a, 2b there is provided a handle 6a and 6b so that the cooking grills 2a and 2b can be easily folded open and shut so as easily to reach the barbecue food between them. As can be seen in FIG. 2, the upper handle 6a is formed with a swivel mounted hook 7 which is always forced into its rest position by means of a spring 8. At its lower end the hook 7 is provided with a lug 9 which one edge of the lower handle 6b grips from behind. In the position illustrated in FIG. 2, the hook 7 holds the two grills 2a and 2b together so that, when these grills are turned, there is no danger of the barbecue food dropping between the grills. Pressing the upper end of the hook 7 against the spring load will release the lug 9 of the hook 7 thus permitting the upper cooking grill 2a to be folded open.

In order to permit turning of the barbecue food carrier 2, a drive is provided in a housing 10 which, in this embodiment, is formed as a conventional windscreen wiper motor of a motor vehicle. Drive transmission onto a shaft 11 carrying a swing lever 12 at its end is effected via toothed rims (not shown) and a chain (not shown). Power supply to the motor may, for instance, be effected via a battery or directly via a power cable.

On the swing lever 12 fixed to the shaft 11 there is arranged a lifting arm 14 carrying a pin 15 on the other end which is arranged on the barbecue food carrier 2. The pin 15 is arranged in a recess of a carrier 20. By slightly forcing the guides 16 apart, it is possible to remove the entire barbecue food carrier 2, e.g. for cleaning. The pin 15 is guided like a sliding block within a vertically aligned guide 16 which is formed as a vertically aligned recess so that the swiveling movement of the swing lever 12 is translated into a purely vertically aligned movement. On the opposite side of the barbecue 1 there is formed, likewise, a guide 17, and a second lifting arm 14 connected with the other end of shaft 11 by means of a swing lever 12 (not shown) is guided correspondingly within this guide 17.

The swing lever 12 also carries a swivel arm 18 whose fulcrum is formed at the swing lever 12 opposite the fulcrum of the lifting arm 14, staggered towards the inside. The swivel arm 18 is connected with an upper swing lever 19 which, again, is firmly connected with the pin 15. When swinging the upper swing lever 18, this swiveling movement is transmitted via pin 15 onto the barbecue food carrier 2 which, likewise, performs a swiveling movement.

The swing lever 12 is, thus, connected in torsionally rigid fashion within the shaft 11, the same as the upper swing lever 19 with the bolt 15. The remaining fulcrums 31, 32, 33 permit one each swiveling movement of the respective pins and levers.

The carrier 20 arranged on the guide 16 on which a retainer 21 arranged at the lower cooking grill 2b is resting during the grill position is provided so as to always achieve a horizontal grill position of the barbecue food carrier 2.

On the inside of the swivel arm 18 there is arranged a guide pin 22 and opposite, on the outside of the lifting arm 14, there is provided a more or less V-shaped claw 23. As will become obvious in the further figures, the guide pin 22, upon a movement of the swivel and lifting arms, will be moved within the range of the claw 23 so that a forced guide of the swivel arm 18 is achieved by means of the claw 23.

The motor is started and/or stopped again via a switch 24; the time interval at which the motor starts in order to turn the barbecue food carrier 2 and/or the pauses can be set by means of a switch not shown for reasons of clarity; it is possible, however, always to start the motor by means of a pressure switch 25 by pressing this pressure switch 25 irrespective of the set time interval, e.g. if it is necessary to fold up the grill immediately, for instance in order to prevent the barbecue food from becoming charred.

Furthermore, the barbecue 1 is provided with a table top 26 arranged on the barbecue 1 by means of hinges 27 and which can be folded up and locked in the horizontal position by means of a supporting mechanism (not shown).

Referring to FIG. 2, this is the side elevation of the barbecue 1; the barbecue food carrier is in its horizontal grill position, i.e. the distance to the bowl 3 for charcoal or the like and/or to other heating devices such as electric heating coils is small. The upper and lower cooking grills 2a, 2b each consist of a frame 27a, 27b which, in turn, carries transverse grills 28. Between the transverse grills of the upper and lower cooking grills 2a, 2b there is an interspace in which the barbecue food is held.

The upper cooking grill 2a carries a contactor 29 for a tappet 30 which, in turn, is connected with a cutout for the motor. If the upper cooking grill 2a is folded open, the contactor 29 will push the tappet 30 back and the motor will be switched off and/or cannot start after the lapse of its rest interval. This offers the advantage that, with the cooking grill 2a folded open, an unintentional turn of the entire barbecue food carrier 2 is avoided.

When the motor is started automatically after the lapse of the rest time interval, the shaft 11 and the swing lever 12 arranged thereon will turn. This causes the lifting arm 14 as well as the pin 15 arranged thereon, which is moving within the guide 16, to be raised. During this upward movement of the lifting arm 14, when the barbecue food carrier 2 is removed from the bowl 3, the swivel arm 18 whose lower fulcrum 31 is arranged closer to the shaft 11 than the lower fulcrum 32 of the lifting arm starts to travel in the direction of the guide 16, causing a rotary movement of the barbecue food carrier 2 via the upper swing lever 19 which is connected in torsionally rigid fashion with the barbecue food carrier 2, but swivel mounted on the swivel arm 18.

Figure 3:
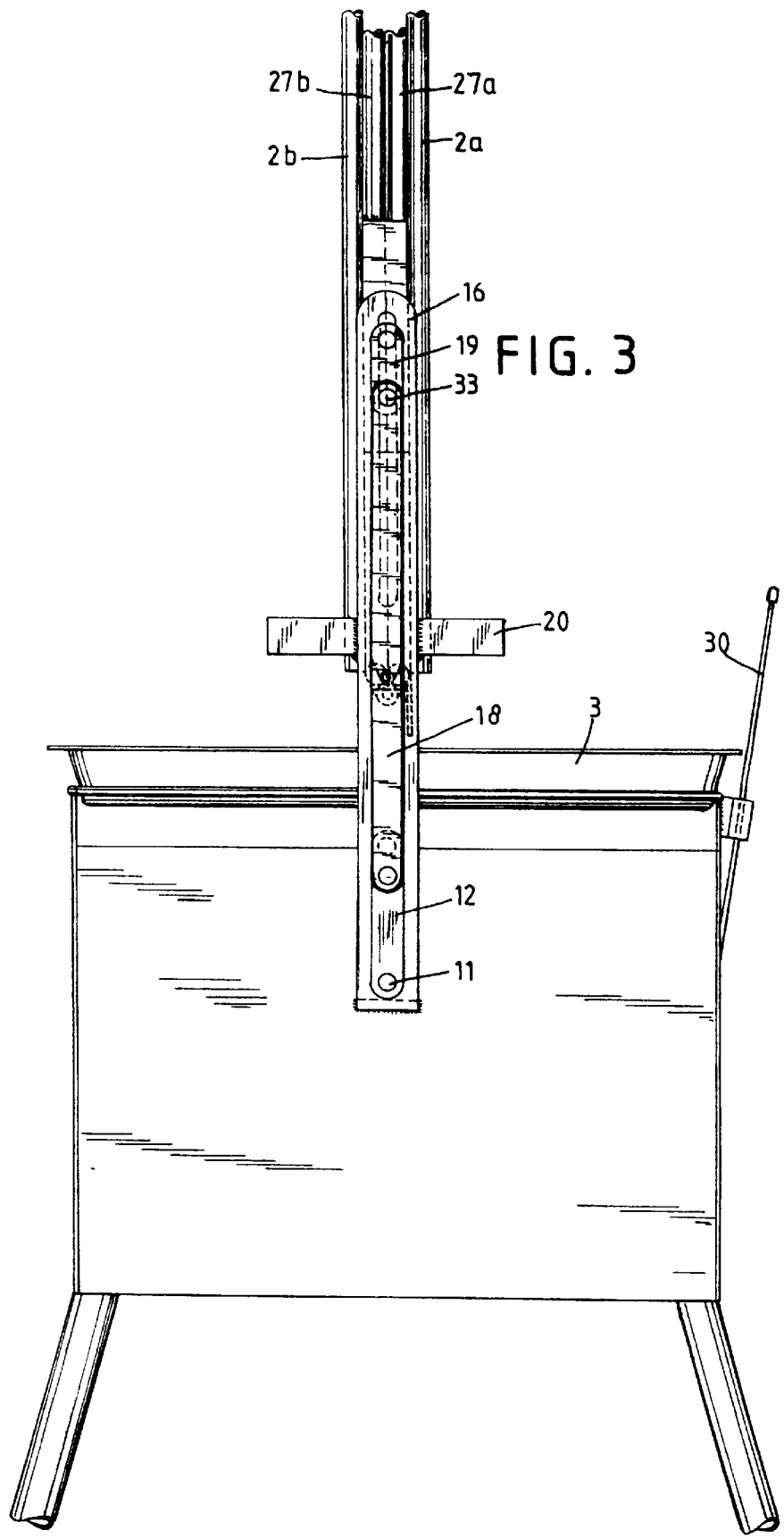
FIG. 3 shows the front face of the barbecue with the barbecue food carrier folded up.
Figure 4:
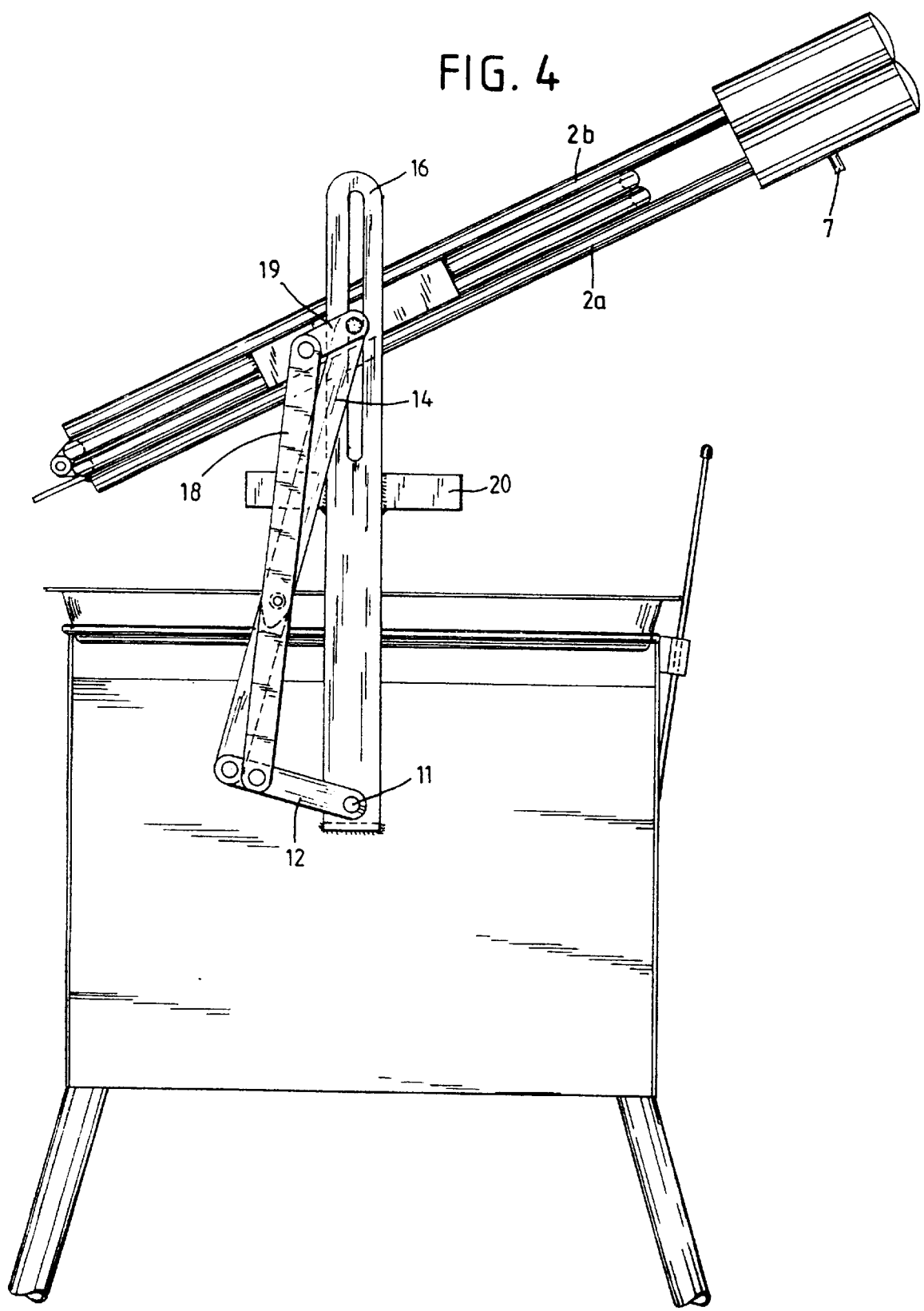
FIG. 4 shows the barbecue food carrier in a further position.

The uppermost position of the lifting arm 14 and swivel arm 18 is illustrated in FIG. 3. The barbecue food carrier 2 is in a vertical position, and the lifting arm 14, the swivel arm 18 as well as the swing levers 12 and 19 are in alignment. Upon a further movement of the swing lever 12, the pin 15 within the guide 16 would be pulled down again and the barbecue food carrier 2 could swing both to the left and right. To avoid swinging-back of the barbecue food carrier 2 into its starting position shown in FIG. 2, the guide pin 22 in the upper position shown in FIG. 3 is located within the claw 23, and when the lifting arm 14 is swung to the left, the claw 23 arranged on the lifting arm will, likewise, pull the swivel arm 18 to the left via the guide pin 22. This will give the swivel arm 18 the desired direction, and upon further movement of the swing lever 12 the barbecue food carrier 2 will start to swing to the other side, as can be seen in FIG. 4. The swiveling movement will continue until the retainer 21 rests upon the carrier 20. The barbecue food carrier 2 remains in this position until the rest interval previously set by the user which, for instance, may be several minutes, has been completed, whereupon the motor will restart the shaft directly in the opposite direction and move the barbecue food carrier 2 into the position illustrated in FIGS. 1 and 2.

A flange provided with an eyelet for accommodating a tension spring developing a tension of, for instance, 5 kgs may be arranged on the shaft 11. This tension spring (not shown) may be supported on the other end on a cross member (not shown) between the legs 4a through 4d. This tension spring enables the shaft 11 to be turned without jerking and is a turning aid for a built-in windshield wiper motor.

I claims:

1. A barbecue comprising:
    a substantially flat barbecue food carrier adjustably separated from a heat source,
    a motor connected to an elevation and rotation device for raising, lowering, and swiveling said barbecue food carrier,
    the elevation and rotation device including
        a lifting arm and a swivel arm moved by means of a drive and connected with the barbecue food carrier,
        the lifting arm and swivel arm having fulcrums spaced from each other to permit a swiveling and rotary movement of the barbecue food carrier with simultaneous movement of the lifting arm and the swivel arm,
        the lifting arm and the swivel arm having guide elements engaged with each other for at least part of a path of motion of the lifting arm and the swivel arm, thereby guiding the swivel arm.

2. The barbecue of claim 1, wherein the guide elements comprise a guide pin and a claw accommodating the guide pin.

3. The barbecue of claim 2, wherein the claw is substantially V-shaped.

4. The barbecue of claim 1, wherein the lifting arm and the swivel arm are jointly driven by a motorized shaft.

5. The barbecue of claim 4, further comprising a swing lever arranged between the shaft and the lifting arm and the swivel arm.

6. The barbecue of claim 1, further comprising an upper swing lever arranged between the swivel arm and the barbecue food carrier.

7. The barbecue of claim 1, wherein the barbecue food carrier comprises two superposed, pivotally coupled cooking grills.

8. The barbecue of claim 7, further comprising a moveable tappet extending between the motor and the cooking grills, whereby pivoting one of the cooking grills manipulates the tappet to stop the drive.

* * * * *